(12) United States Patent
Kono et al.

(10) Patent No.: US 11,415,215 B2
(45) Date of Patent: Aug. 16, 2022

(54) SHIFT APPARATUS

(71) Applicant: HONDA MOTOR CO., LTD., Tokyo (JP)

(72) Inventors: Satoshi Kono, Saitama (JP); Fumitaka Abe, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/210,477

(22) Filed: Mar. 23, 2021

(65) Prior Publication Data

US 2021/0301917 A1    Sep. 30, 2021

(30) Foreign Application Priority Data

Mar. 30, 2020  (JP) .............................. JP2020-061197

(51) Int. Cl.
| | |
|---|---|
| *F16H 59/08* | (2006.01) |
| *B60K 35/00* | (2006.01) |
| *F16H 59/50* | (2006.01) |
| *F16H 61/18* | (2006.01) |
| *F16H 59/74* | (2006.01) |

(52) U.S. Cl.
CPC ............ *F16H 59/08* (2013.01); *B60K 35/00* (2013.01); *F16H 59/50* (2013.01); *F16H 59/74* (2013.01); *F16H 61/18* (2013.01); *B60K 2370/167* (2019.05); *F16H 2059/081* (2013.01); *F16H 2059/746* (2013.01)

(58) Field of Classification Search
CPC .......... F16H 59/08; F16H 59/50; F16H 59/74; F16H 2059/081; F16H 2059/746; F16H 61/18; B60K 35/00; B60K 2370/167
See application file for complete search history.

(56) References Cited

U.S. PATENT DOCUMENTS

| | | | |
|---|---|---|---|
| 2011/0219901 A1* | 9/2011 | Giefer | B60K 37/06 74/473.3 |
| 2013/0047768 A1 | 2/2013 | Kamoshida et al. | |
| 2018/0223988 A1* | 8/2018 | Preisig | F16H 59/08 |
| 2018/0257665 A1 | 9/2018 | Sannodo | |
| 2021/0079998 A1 | 3/2021 | Nakanishi et al. | |

FOREIGN PATENT DOCUMENTS

| | | |
|---|---|---|
| CN | 110785309 A | 2/2020 |
| JP | H640517 U | 5/1994 |
| JP | 2001334836 A | 12/2001 |
| JP | 2013047074 A | 3/2013 |
| JP | 2018144751 A | 9/2018 |
| JP | 2019006308 A | 1/2019 |
| JP | 2019206294 A | 12/2019 |

\* cited by examiner

*Primary Examiner* — Edwin A Young
(74) *Attorney, Agent, or Firm* — CKC & Partners Co., LLC

(57) ABSTRACT

A driver is enabled to, even if a range selected by the driver and an actual range of the vehicle are different from each other, correctly recognize the actual range of the vehicle without occurrence of disagreement between an indicated range and the actual range of the vehicle. A display means is capable of indicating a range irrespective of a rotation operation of a shift member, and a range of the vehicle is capable of being switched to the range irrespective of the rotation operation of the shift member; and an instruction to the display means and an instruction to switch the range of the vehicle are provided from either one of first control means for indication control or second control means for vehicle range switching control.

3 Claims, 7 Drawing Sheets

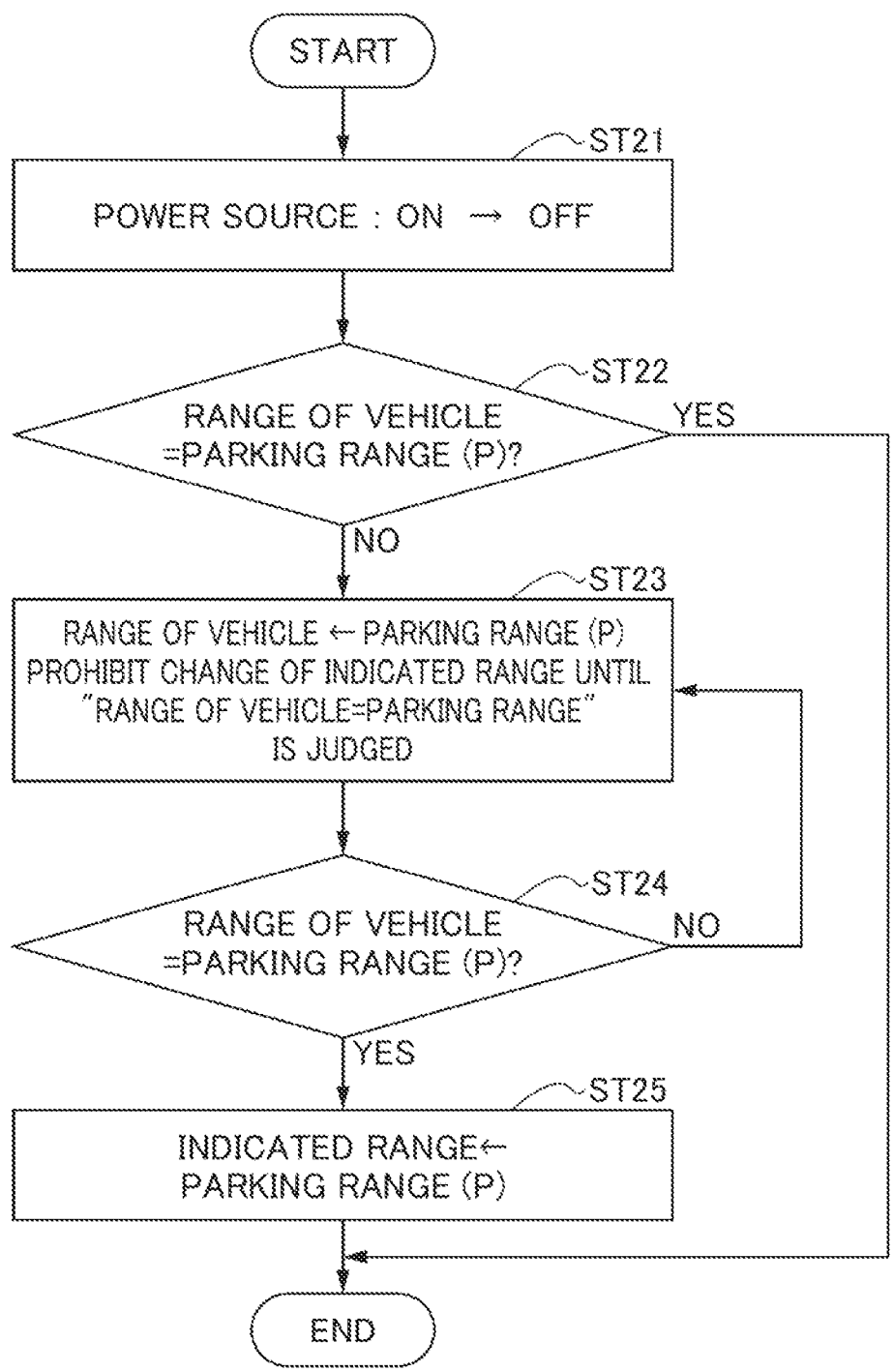

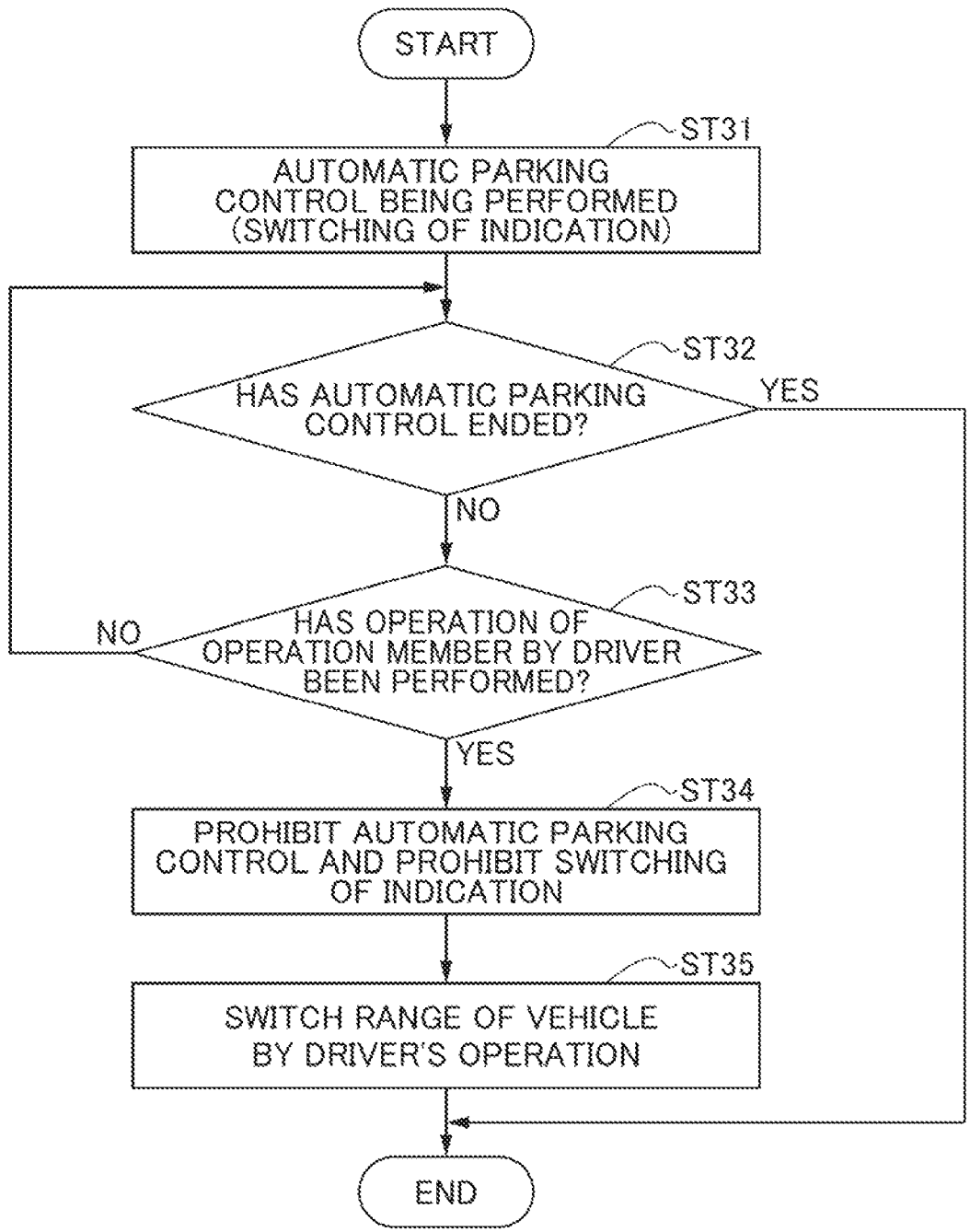

SHIFT APPARATUS

This application is based on and claims the benefit of priority from Japanese Patent Application No. 2020-061197, filed on 30 Mar. 2020, the content of which is incorporated herein by reference.

BACKGROUND OF THE INVENTION

Field of the Invention

The present invention relates to a shift apparatus for switching a range of a transmission mounted on a vehicle and, in particular, to a shift apparatus provided with means configured to prevent disagreement between a range of a display unit of the shift apparatus and a range of a vehicle.

Related Art

A shift apparatus that is provided near a display panel in front of a driver or a vehicle travel operation handle in a vehicle and is capable of switching and selecting a range by a rotation operation of a rotation operation member has been conventionally known. In the conventional shift apparatus, a current shift range is indicated according to a range selected by the rotation operation member.

In Japanese Unexamined Patent Application, Publication No. 2013-47074, a shift apparatus is described in which selection among shift ranges that a driver can switch to by one operation is restricted so that shift range switching that is not intended by the driver can be avoided from being performed. As described above, devices are made so that shift range switching intended by a driver can be performed.
Patent Document 1: Japanese Unexamined Patent Application, Publication No. 2013-47074

SUMMARY OF THE INVENTION

However, an appropriate range is not necessarily always selected by shift range switching intended by a driver intends. For example, if a driver stops a vehicle at a range other than a P (parking) range and gets out of the vehicle, it cannot be said that an appropriate range has been selected. Such that performs control to, when the driver stops the vehicle in a range other than the P range, automatically switch to the P range is known. When the vehicle automatically switches the shift range of the transmission to a range different from a range that a driver has selected by performing a rotation operation of the rotation operation member of the shift apparatus as described above, it is necessary to indicate a range on a display unit of the shift apparatus according to the range that the vehicle (the transmission) has actually selected.

In this case, if a control device for the display unit that indicates the range of the shift apparatus specifies a range to be indicated on the display unit of the shift apparatus, and a control device that switches the range of the vehicle (the transmission) specifies a range to be switched to, to the vehicle (the transmission), that is, if a range indicated by the display unit of the shift apparatus and a range switched to by the vehicle (the transmission) are specified by different control devices, both ranges do not agree with each other, and the driver may wrongly recognize an actual range of the vehicle.

The present invention has been devised to solve such a problem included in the conventional technique, and an object is to, even if a range that the driver has selected by performing a rotation operation of the rotation operation member of the shift apparatus and a range that the vehicle (the transmission) has actually selected are different from each other, enable the driver to correctly recognize an actual range of the vehicle without occurrence of disagreement between an indicated range and the actual range of the vehicle.

In order to solve such a problem, in the present invention, there is provided a shift apparatus of a vehicle, the shift apparatus including: a shift member that is enabled to switch to any of a plurality of predetermined ranges by performing a rotation operation of a dial-type operation member; first control means configured to, in response to switching to a range of the predetermined ranges, cause display means to indicate the range; and second control means configured to, in response to an operation of the shift member, switch the range of the vehicle; in which the display means is capable of indicating a range irrespective of the rotation operation of the shift member, and the range of the vehicle is capable of being switched to a range irrespective of the rotation operation of the shift member; and an instruction to switch the range of the vehicle and an instruction for the display means are provided from either one of the first control means or the second control means.

According to this configuration, even if the vehicle automatically switches the range irrespective of a rotation operation of the shift member by the driver, the indication instruction to the display means and the instruction to switch the range of the vehicle are provided by the same control means, and, therefore, disagreement between both instructions does not occur. Therefore, the driver can correctly recognize an actual range of the vehicle.

Further, in this case, in the present invention, if a current range of the vehicle and a range that the display means is instructed to indicate are different from each other, an instruction to indicate the current range of the vehicle on the display means is provided; and, when the operation member is positioned between positions of two of the plurality of predetermined ranges, the current range of the vehicle is prohibited from being indicated.

According to this configuration, by causing the display means to indicate a range corresponding to a current range of the vehicle, the driver can correctly recognize an actual current range of the vehicle. Further, if the operation member is positioned between positions of two of the plurality of predetermined ranges, it is unknown which range the driver intends to select. Therefore, in this case, it is prohibited to indicate a range corresponding to the range of the vehicle on the display means.

Further, in this case, in the present invention, there is provided automatic parking range switching control of, if a power source (IG) of the vehicle is turned off in a state in which any of the predetermined ranges other than a parking range is set, switching the range of the vehicle to the parking range; and an instruction for the display means to indicate the parking range is provided when judging that the parking range has been switched to, and such indication is prohibited until judging that the parking range has been switched to is made.

According to this configuration, when the automatic parking range switching control is performed, indication on the display means is changed to the parking range when it is judged that the range of the vehicle has been switched to the parking range. Therefore, the range of the vehicle agrees with a range indicated on the display means. Further, by prohibiting change of indication on the display means until it is judged that the range of the vehicle is switched to the parking range, the driver can accurately recognize when the range of the vehicle is automatically switched.

Further, in this case, in the present invention, there is provided automatic parking control of performing a parking operation by automatically switching the range of the vehicle to a drive range or a reverse range; and, if the operation member is operated during the automatic parking control, the automatic parking control is prohibited, and switching of indication on the display means is also prohibited.

According to this configuration, though, if a range switching operation is performed by the driver during the automatic parking control, a possibility occurs that a current range of the vehicle and a range indicated on the display means do not correspond to each other. At this time, by prohibiting the automatic parking control as well as prohibiting switching of indication on the display means, it is possible to prevent disagreement between the current range of the vehicle and the range indicated on the display means.

Thus, according to the present invention, even if a range set by an operation by a driver and a current range of a vehicle are different from each other, it is possible to prevent occurrence of disagreement between the range indicated on display means and the current range of the vehicle, and it is possible to prevent the driver from wrongly recognizing the current range of the vehicle.

BRIEF DESCRIPTION OF THE DRAWINGS

FIG. 6 is a flowchart of control in a case where a power source is turned off in a range of the vehicle other than a parking range; and FIG. 7 is a flowchart of control in a case where an operation by the driver is performed during automatic parking control.

DETAILED DESCRIPTION OF THE INVENTION

An embodiment of the present invention will be described in detail with reference to drawings.

Figure 1:
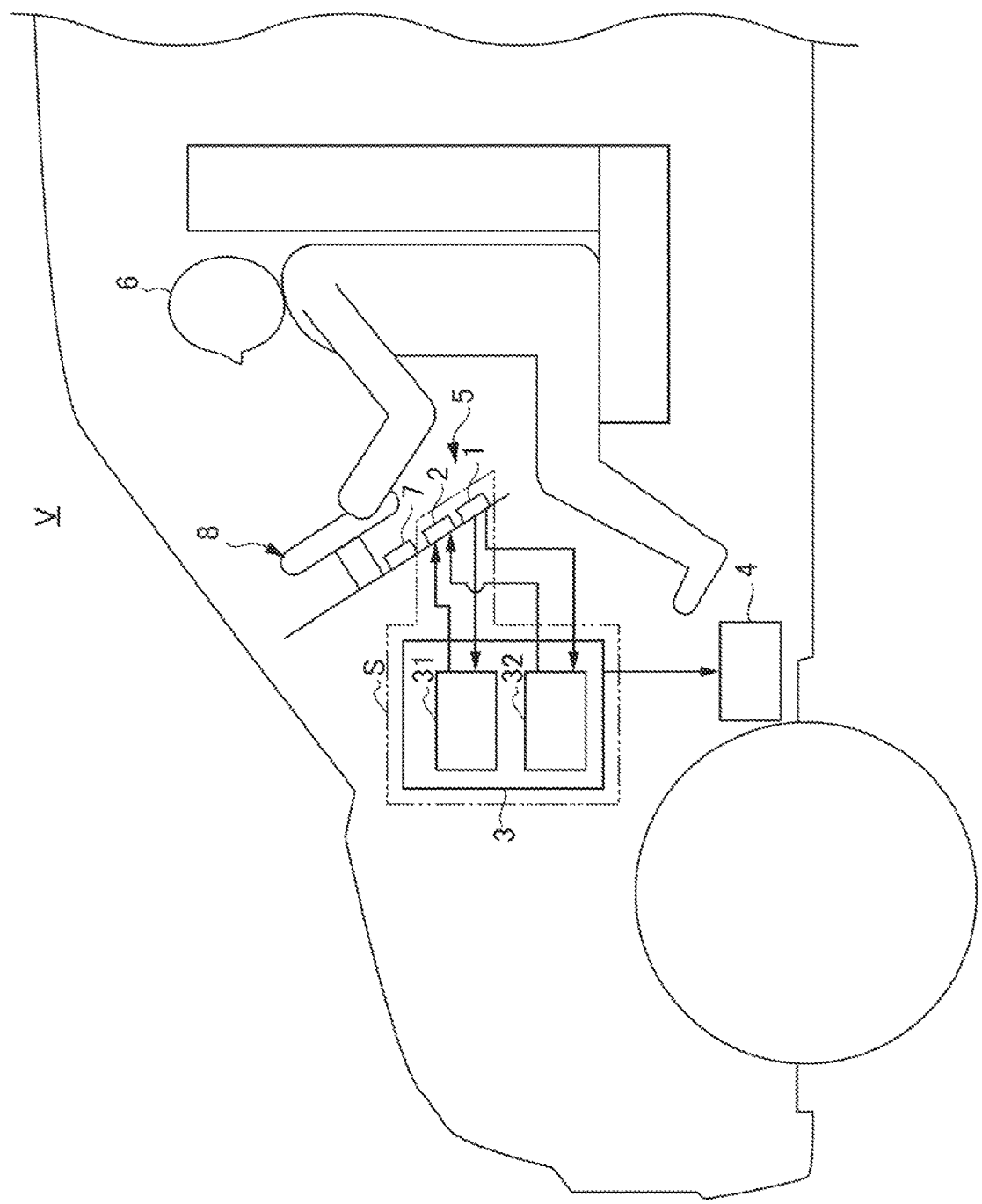
FIG. 1 is a diagram showing an overview of a control path system of a shift apparatus of the present invention on a vehicle.
Figure 2:
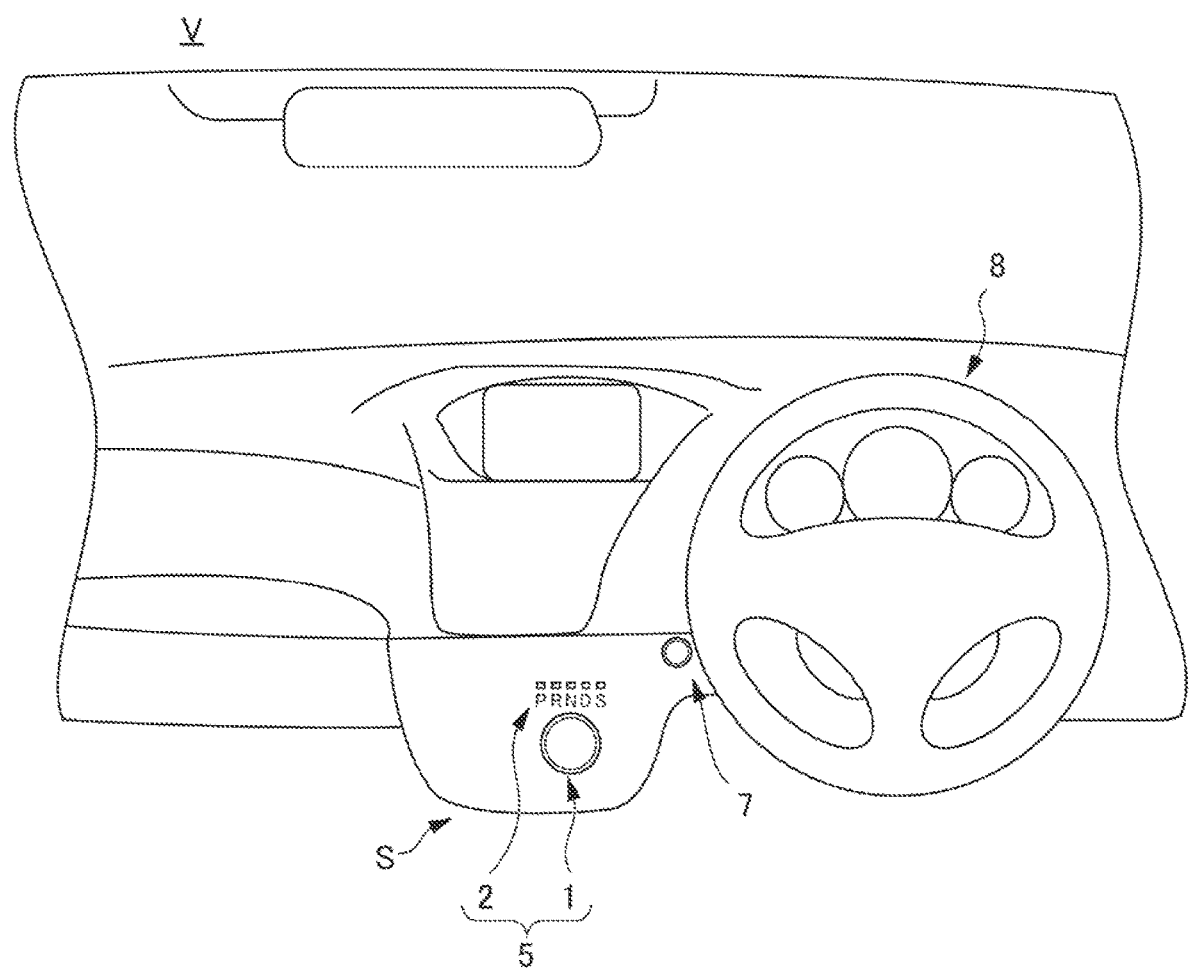
FIG. 2 is a diagram showing arrangement of an operation members and a display member in front of a driver in a vehicle according to the present invention.

A shift apparatus S of a vehicle V includes a shift member 1, a display unit 2, first control means 31 and second control means 32. The shift member 1 is a member that selects the shift range of a transmission 4 of the vehicle V. As shown in FIGS. 1 and 2, the shift member 1 is arranged on a display panel 5 in front of a driver 6 and below the left side of a vehicle travel operation handle 8. The display unit 2 is arranged above the shift member 1. In the vehicle V, a control device 3 that includes the first control means 31 for controlling the display unit 2 and the second control means 32 for controlling a vehicle range switching device 41 of the transmission 4 is provided. A power switch 7 of the vehicle V is arranged on the lower left side behind the vehicle travel operation handle 8. The transmission 4 may be a transmission by the motor of an electric vehicle.

Figure 3:
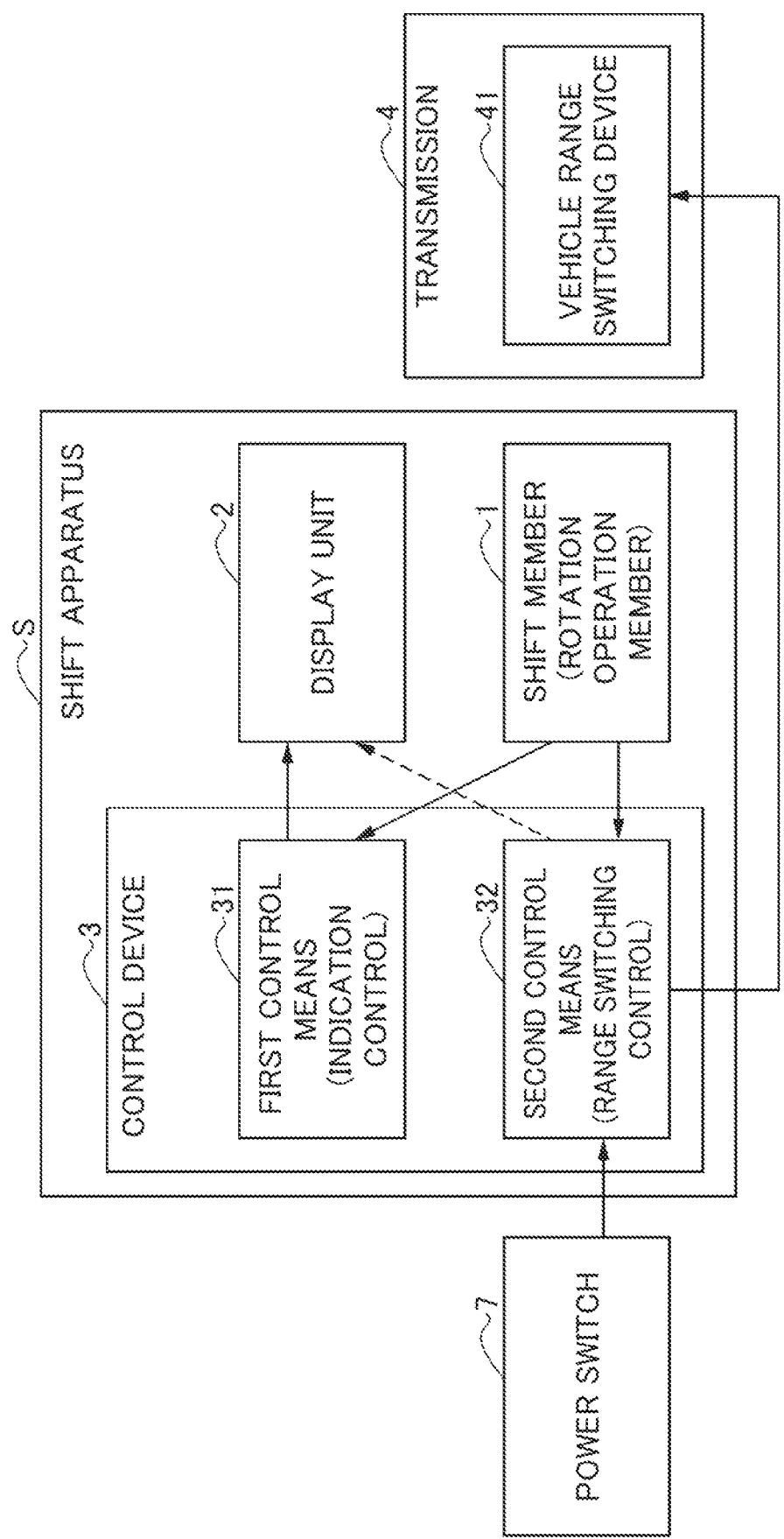
FIG. 3 is a block diagram showing the control path system of the shift apparatus of the present invention.

FIG. 3 is a block diagram showing a control path system of the shift apparatus S. The first control means 31 controls indication of a range on the display unit 2 of the shift apparatus S in response to a signal from the shift member 1 (an operation member). The second control means 32 controls range switching by the vehicle range switching device 41 of the transmission 4 in response to a signal from the shift member 1 (the operation member). When the second control means 32 switches a range by the vehicle range switching device 41, the first control means 31 controls indication of a range by the display unit 2 according to the range switched to. A signal from the power switch 7 may influence the control by the second control means 32. As described later, the control of indication of a range on the display unit 2 may be performed not by the first control means 31 but by the second control means 32 according to situations. Further, in a situation in which the second control means 32 cannot recognize a range position of the vehicle range switching device 41, for example, immediately after the power switch 7 is turned on from an off state or immediately after the power source of the vehicle V is restored after having been shut down, the first control means 31 controls switching of the vehicle range switching device 41 according to a range to be indicated on the display unit 2.

Figure 4:
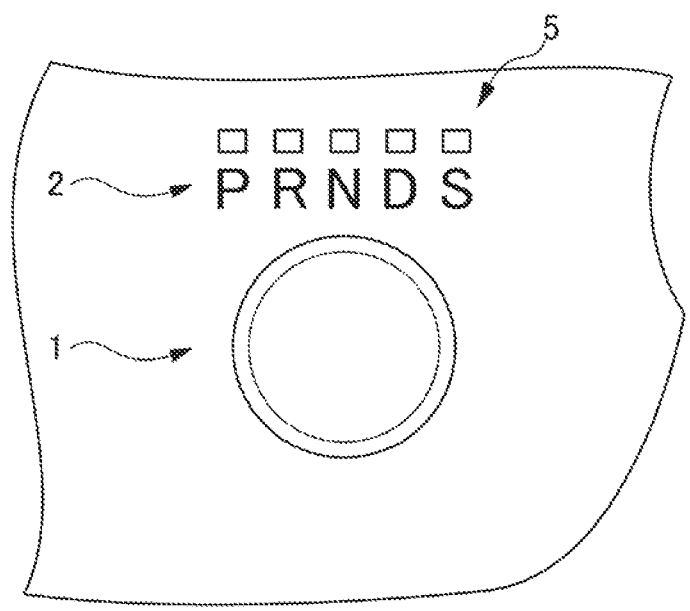
FIG. 4 is an overview configuration diagram of the operation member and the display member of the shift apparatus of the present invention.

As shown in FIG. 4, the shift member 1 is configured with a rotation operation member having a dial-type cylindrical knob member. The display unit 2 is arranged above the shift member 1 and indicates a range selected by operating the shift member 1. As described later, the display unit 2 may indicate not the range selected by operating the shift member 1 but an actual range of the vehicle V switched by the vehicle range switching device 41.

Ranges that are switched by the vehicle range switching device 41 and that are indicated on the display unit 2 include, in addition to a P (parking) range at the time of parking, an R (reverse) range for causing the vehicle V to reversely travel, an N (neutral) range for blocking transmission of driving force and a D (drive) range for causing the vehicle V to travel forward, an L (low (1st speed)) range, a 2 (second) range, an S (sports mode) range, a B (regenerative braking) range and the like. The shift apparatus S of the present embodiment has the P, R, N, D and S ranges, and indications indicating the ranges are arranged on the display unit 2 in order of P, R, N, D and S from the left side.

In the vehicle shift apparatus S of the present invention, the vehicle range switching device 41 of the transmission 4 is adapted to be capable of switching to a range irrespective of a rotation operation of the shift member 1, and the display unit 2 is adapted to be capable of indicating the range irrespective of the rotation operation of the shift member 1 if the driver 6 selects an inappropriate range.

For example, if, after stopping the vehicle V, the driver 6 turns off the vehicle power source from an on state and gets out of the vehicle V in a state in which a range other than the parking range (P) has been selected by the shift member 1, it cannot be said that the selection of the range by the driver 6 is appropriate. The shift apparatus S of the present invention is configured to be capable of, in the above case, automatically switching the range of the vehicle V to the parking range (P) by controlling the vehicle range switching device 41 by the second control means 32.

If, when the range of the vehicle V is automatically switched as described above, indication on the display unit 2 remains the same and does not change, an actual range of the vehicle V and the range indicated on the display unit 2 do not agree with each other, and the driver 6 cannot recognize that the actual range of the vehicle V has been switched to the parking range (P) by the vehicle range switching device 41. Therefore, in this case, it is possible in the shift apparatus S of the present invention that control of indication on the display unit 2 is performed not in response to an instruction (reception of a signal) from the first control means 31 but in response to an instruction (reception of a signal) from the second control means 32, so that it is possible to cause an indication on the display unit 2 to agree with the actual range of the vehicle V. In the above case, in response to an instruction from the second control means 32 that recognizes that the actual range of the vehicle V is the parking range (P), the range indicated on the display unit 2 is set to the parking range (P).

As an example of the case where an operation of selecting a range by the driver 6 is inappropriate, a case where the shift member 1 is positioned between positions of two of the predetermined ranges by an operation of the shift member 1 by the driver 6 is considered. In this case, it is unknown which range the driver 6 intended to select. Therefore, in this case, the control of causing indication on the display unit 2 to agree with an actual range of the vehicle V is prohibited.

Next, a description will be made on a flow of the control in the case where a range indicated on the display unit 2 of the shift apparatus S is different from an actual range of the vehicle V switched to by the vehicle range switching device 41, with reference to the flowchart of FIG. 5.

Figure 5:
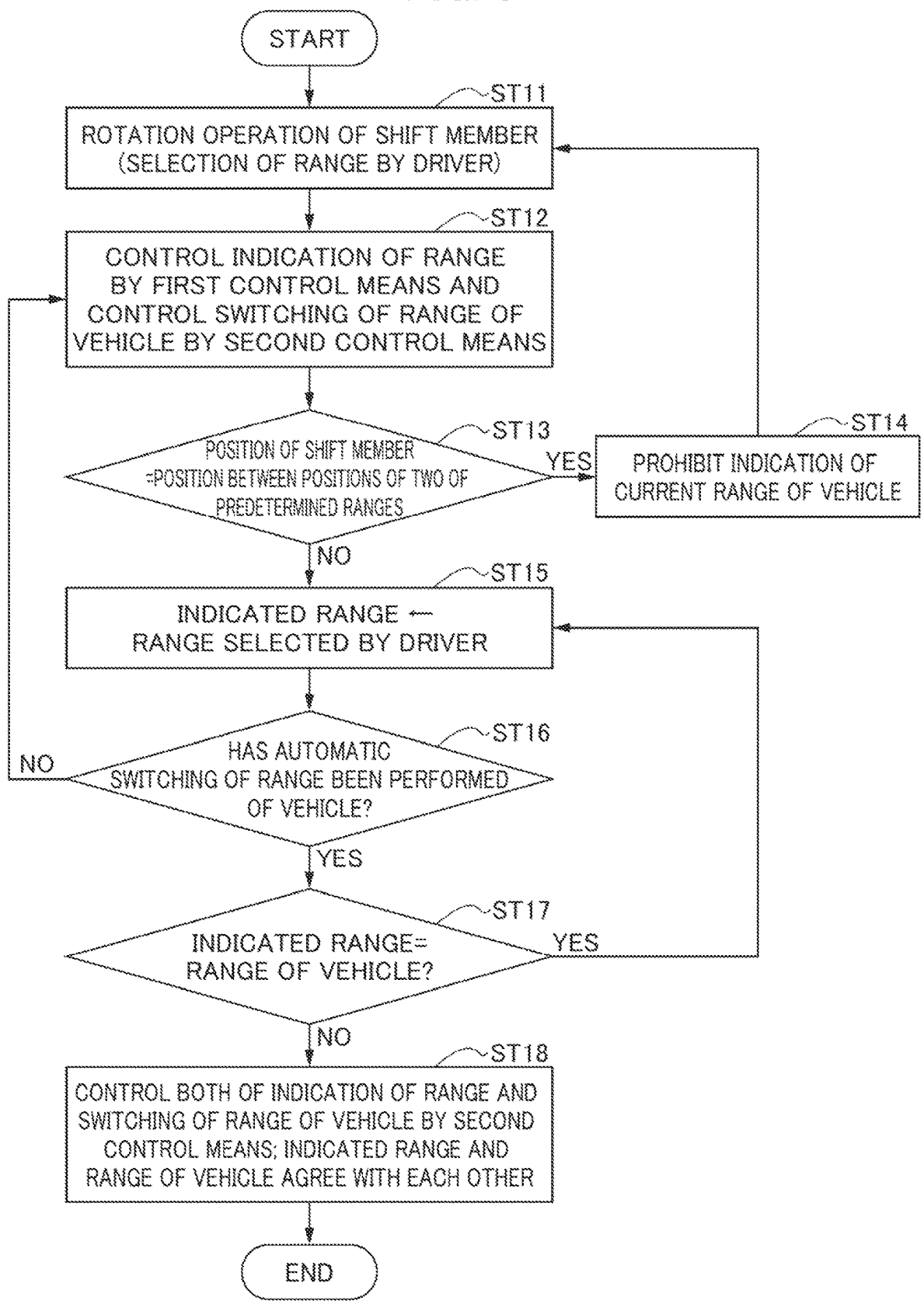
FIG. 5 is a flowchart of control in a case where an indicated range is different from an actual range of the vehicle.

As shown in FIG. 5, first, the driver 6 performs a rotation operation of the shift member 1 to select a range (step ST11). At this time, indication of the range on the display unit 2 of the shift apparatus S is controlled by the first control means 31, and switching of a range of the vehicle V by the vehicle range switching device 41 is controlled by the second control means 32 (step ST12).

Next, the first control means 31 judges whether the position of the shift member 1 of the shift apparatus S is not positioned between positions of two of the predetermined ranges (step ST13). In the case of YES, that is, if the position of the shift member 1 of the shift apparatus S is positioned between positions of two of the predetermined ranges, the flow proceeds to ST14. In the case of NO, that is, if the position of the shift member 1 of the shift apparatus S is set at a position of any of the predetermined ranges, the flow proceeds to step ST15.

At step ST14, since it is unknown which range the driver 6 intended to select if the position of the shift member 1 of the shift apparatus S is positioned between positions of two of the predetermined ranges, it is prohibited to indicate an actual range of the vehicle V on the display unit 2 of the shift apparatus S (step ST14). Then, the flow returns to step ST11. After that, unless a rotation operation of the shift member 1 is newly performed, and the judgment result of step ST13 is NO, that is, unless the position of the shift member 1 of the shift apparatus S is set at a position of any of the predetermined ranges, the control of prohibiting the actual range of the vehicle V from being indicated on the display unit 2 of the shift apparatus S is continued.

On the other hand, at step ST15, since the position of the shift member 1 of the shift apparatus S is set at a position of any of the predetermined ranges, the range that the driver 6 has selected by operating the shift member 1 is indicated on the display unit 2 of the shift apparatus S by the first control means 31 (step ST15).

Next, it is judged by the second control means 32 whether automatic switching of the range of the vehicle V has been performed by the vehicle range switching device 41 or not (step ST16). In the case of YES, that is, if automatic switching of the range of the vehicle V has been performed by the vehicle range switching device 41, the flow proceeds to step ST17. In the case of NO, that is, if automatic switching of the range of the vehicle V has not been performed by the vehicle range switching device 41, the flow returns to step ST12.

In the case of NO at step ST16 described above, the flow returns to step ST12, where the control of controlling indication of a range on the display unit 2 of the shift apparatus S by the first control means 31 and controlling switching of the range of the vehicle V by the vehicle range switching device 41, by the second control means 32 is continued. After that, unless automatic switching of the range of the vehicle V is performed by the vehicle range switching device 41, that is, unless it is judged again at step ST16 whether automatic switching of the range of the vehicle V has been performed or not, and the judgment result is YES, a loop of transition in order of steps ST12, ST13, ST15, ST16 and ST12 is repeated, and the range that the driver 6 has selected by operating the shift member 1 continues to be indicated on the display unit 2 of the shift apparatus S.

Next, after the judgment result of step ST16 described above is YES, that is, after it is judged that automatic switching of the range of the vehicle V has been performed, it is judged whether or not the range indicated on the display unit 2 of the shift apparatus S and a range of the vehicle V switched to and selected by the vehicle range switching device 41 agree with each other (step ST17). If the judgment result is YES, that is, if the range indicated on the display unit 2 of the shift apparatus S and the range of the vehicle V switched to and selected by the vehicle range switching device 41 agree with each other, the flow returns to step ST15, where the control of indicating the range that the driver 6 has selected by operating the shift member 1 on the display unit 2 of the shift apparatus S is continued. If the judgment result is NO, that is, if the range indicated on the display unit 2 of the shift apparatus S and the range of the vehicle V switched to and selected by the vehicle range switching device 41 are different from each other, the flow proceeds to step ST18.

At step ST18, in response to the judgment of the step ST17 described above that the range indicated on the display unit 2 of the shift apparatus S and the range of the vehicle V switched to and selected by the vehicle range switching device 41 are different from each other, switching is performed so that not only control of switching the range of the vehicle V by the vehicle range switching device 41 but also control of indication on the display unit 2 of the shift apparatus S is controlled by the second control means 32. Thereby, it is possible to cause the range indicated on the display unit 2 of the shift apparatus S to agree with the range of the vehicle V switched to and selected by the vehicle range switching device 41 (step ST18).

Next, a description will be made on a flow of control performed in the case where the power source of the vehicle V is turned off in a state in which the range of the vehicle V is set to a range other than the parking range (P), with reference to the flowchart of FIG. 6.

As shown in FIG. 6, first, when the vehicle power source is turned off from an on state by an operation of the power switch 7 of the vehicle V (step ST21), it is judged whether the range of the vehicle V is set to the parking range (P) or not (step ST22). If the judgment result is YES, that is, if both ranges at the time of the vehicle power source being turned off are set to the parking range (P), there is no problem. Therefore, the flow ends without taking any measures. If the judgment result is NO, that is, if both ranges at the time of the vehicle power source being turned off are set to a range other than the parking range (P), the flow proceeds to step ST23.

At step ST23, an instruction to switch the range of the vehicle V is provided to the vehicle range switching device 41 to set the range of the vehicle V to the parking range (P). In this case, as for the display unit 2 of the shift apparatus S, it is prohibited to change the indicated range until a judgment result that the range of the vehicle V has become the parking range (P) is received (step ST23).

Next, it is judged again whether the range of the vehicle V is set to the parking range (P) or not (step ST24). If the judgment result is YES, that is, if it can be confirmed that the range of the vehicle V is actually set to the parking range (P) after giving the instruction to switch the range of the vehicle V to the parking range (P), the flow proceeds to step ST25, where the range indicated on the display unit 2 of the shift apparatus S is switched to the parking range (P) (step ST25), and the control flow ends.

On the other hand, if the judgment result of step ST24 is NO, that is, if it cannot be confirmed that the range of the vehicle V is actually set to the parking range (P) after giving the instruction to switch the range of the vehicle V to the parking range (P), the flow returns to step ST23. Then, it is judged again at step ST24 whether the range of the vehicle V is set to the parking range (P) or not. Unless it is confirmed that the range of the vehicle V is set to the parking range (P), a loop of transition in order of steps ST23, ST24 and ST23 is repeated. Thereby, it is possible to, when the range of the vehicle V is changed to the parking range (P), avoid a range different from an actual range of the vehicle V from being indicated.

Next, a description will be made on an example in which, when control of causing the vehicle range switching device 41 of the transmission 4 to switch the range of the vehicle V is being performed by the second control means 32 of the shift apparatus S, and control of automatically switching the range of the vehicle V to the drive range (D) or the reverse range (R) to perform a parking operation is being performed, the driver 6 performs an operation of switching the range of the vehicle V by the shift member 1 of the shift apparatus S, as another embodiment of the present invention. During the automatic parking control of automatically switching the range of the vehicle V to the drive range (D) or the reverse range (R) to perform a parking operation, the drive range (D) or the reverse range (R) is switched to and indicated on the display unit 2 of the shift apparatus S, too, according to an actual range of the vehicle V that has been automatically switched to.

When the driver 6 operates the shift member (the operation member) 1 of the shift apparatus S during the automatic parking control, the automatic parking control is discontinued. At that time, for the control of switching of indication to the drive range (D) or the reverse range (R) on the display unit 2 of the shift apparatus S performed during the automatic parking control, the switching of indication is prohibited. Thereby, it is possible to avoid disagreement between a current actual range of the vehicle V and a range indicated on the display unit 2 of the shift apparatus S.

Next, a description will be made on a flow of control performed in the case where the driver 6 operates the shift member (the operation member) 1 of the shift apparatus S during the automatic parking control, with reference to the flowchart of FIG. 7.

As shown in FIG. 7, first, an operation of the automatic parking control is performed, that is, an operation of switching an actual range of the vehicle V to the drive range (D) or the reverse range (R) by the vehicle range switching device 41 to automatically park is performed by the second control means 32 of the shift apparatus S. During this automatic parking control, the drive range (D) or the reverse range (R) is switched to and indicated on the display unit 2 of the shift apparatus S, too, according to the actual range of the vehicle V (step ST31).

At an appropriate timing during the automatic parking control, it is judged whether the automatic parking control has ended or not (step ST32). If the judgment result is YES, that is, if the automatic parking control has ended, the flow ends without taking any measures. If the judgment result is NO, that is, if the automatic parking control has not ended, the flow proceeds to step ST33.

At step ST33, it is judged whether the driver 6 has operated the shift member (the operation member) 1 of the shift apparatus S or not (step ST33). If the judgment result is YES, that is, if the driver 6 has operated the shift member (the operation member) 1 of the shift apparatus S during the automatic parking control, the flow proceeds to step ST34. On the other hand, if the judgment result is NO, that is, if the driver 6 has not operated the shift member (the operation member) 1 of the shift member S, the flow returns to step ST32. Then, unless the judgment result is YES at step ST32, that is, the automatic parking control has ended, a loop of transition in order of steps ST32, ST33 and ST32 is repeated, and it is waited for that the automatic parking control ends or that the shift member 1 is operated by the driver 6.

At step ST34, the automatic parking control is discontinued, that is, the control of switching the actual range of the vehicle V to the drive range (D) or the reverse range (R) to automatically park is discontinued by the second control means 32 of the shift apparatus S by the vehicle range switching device 41. At this time, switching of indication on the display unit 2 of the shift apparatus S is also prohibited (step ST34). Thereby, it is possible to avoid, when the driver 6 operates the shift member 1 of the shift apparatus S during the automatic parking control, disagreement between an actual range of the vehicle V and a range indicated on the display unit 2 of the shift apparatus S.

Then, after the driver 6 performs an operation during the automatic parking control, and the automatic parking control ends, a parking operation or a vehicle traveling operation is performed by normal switching of the range of the vehicle V by an operation of the shift member 1 of the shift apparatus S by the driver 6 is performed (step ST35), and the control flow ends.

The present invention has been described above using embodiments. The present invention, however, is not limited to the embodiments at all, and it goes without saying that the present invention can be practiced in various embodiments within a range not departing from the spirit of the present invention.

EXPLANATION OF REFERENCE NUMERALS

V: Vehicle
S: Shift apparatus
1: Shift member (operation member)
2: Display unit of shift member
3: Control device
31: First control means (control means of display unit)
32: Second control means (control means of vehicle range switching device)

4: Transmission
41: Vehicle range switching device
5: Display panel
6: Driver
7: Power switch
8: Vehicle travel operation handle

What is claimed is:

1. A shift apparatus of a vehicle, the shift apparatus comprising:
a shift member that is enabled to switch to any of a plurality of predetermined ranges by performing a rotation operation of a dial-type operation member;
first control means configured to, in response to switching to a range of the predetermined ranges, cause display means to indicate the range; and
second control means configured to, in response to an operation of the shift member, switch the range of the vehicle; wherein
the display means is capable of indicating a range irrespective of the rotation operation of the shift member, and the range of the vehicle is capable of being switched to a range irrespective of the rotation operation of the shift member; and
an instruction to switch the range of the vehicle and an instruction for the display means are provided from either one of the first control means or the second control means,
and the shift apparatus, wherein
if a current range of the vehicle and a range that the display means is instructed to indicate are different from each other, an instruction to indicate the current range of the vehicle on the display means is provided; and
when the operation member is positioned between positions of two of the plurality of predetermined ranges, the current range of the vehicle is prohibited from being indicated.

2. A shift apparatus of a vehicle, the shift apparatus comprising:
a shift member that is enabled to switch to any of a plurality of predetermined ranges by performing a rotation operation of a dial-type operation member;
first control means configured to, in response to switching to a range of the predetermined ranges, cause display means to indicate the range; and
second control means configured to, in response to an operation of the shift member, switch the range of the vehicle; wherein
the display means is capable of indicating a range irrespective of the rotation operation of the shift member, and the range of the vehicle is capable of being switched to a range irrespective of the rotation operation of the shift member; and
an instruction to switch the range of the vehicle and an instruction for the display means are provided from either one of the first control means or the second control means,
and the shift apparatus, comprising automatic parking range switching control of, if a power source of the vehicle is turned off in a state in which any of the predetermined ranges other than a parking range is set, switching the range of the vehicle to the parking range, wherein
an instruction for the display means to indicate the parking range is provided when judging that the parking range has been switched to, and such indication is prohibited until judging that the parking range has been switched to.

3. A shift apparatus of a vehicle, the shift apparatus comprising:
a shift member that is enabled to switch to any of a plurality of predetermined ranges by performing a rotation operation of a dial-type operation member;
first control means configured to, in response to switching to a range of the predetermined ranges, cause display means to indicate the range; and
second control means configured to, in response to an operation of the shift member, switch the range of the vehicle; wherein
the display means is capable of indicating a range irrespective of the rotation operation of the shift member, and the range of the vehicle is capable of being switched to a range irrespective of the rotation operation of the shift member; and
an instruction to switch the range of the vehicle and an instruction for the display means are provided from either one of the first control means or the second control means,
and the shift apparatus, comprising automatic parking control of performing a parking operation by automatically switching the range of the vehicle to a drive range or a reverse range; wherein
if the operation member is operated during the automatic parking control, the automatic parking control is prohibited, and switching of indication on the display means is also prohibited.

* * * * *